(12) United States Patent
Smith (10) Patent No.: US 8,690,194 B1
(45) Date of Patent: Apr. 8, 2014

(54) FLEXIBLE METAL CONDUIT TO ELECTRICAL METALLIC TUBING/RIGID CONDUIT TRANSITION COUPLER

(71) Applicant: Bridgeport Fittings, Inc., Stratford, CT (US)

(72) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 13/759,412

(22) Filed: Feb. 5, 2013

(51) Int. Cl.
*F16L 11/118* (2006.01)
(52) U.S. Cl.
USPC ............... 285/149.1; 285/154.4; 285/373
(58) Field of Classification Search
USPC .......... 285/149.1, 154.3, 154.4, 154.1, 154.2, 285/419, 373
See application file for complete search history.

(56) References Cited

U.S. PATENT DOCUMENTS

| | | | | |
|---|---|---|---|---|
| 920,169 A | * | 5/1909 | Neuberth | 285/419 |
| 1,475,524 A | * | 11/1923 | Thomas, Jr. | 285/154.3 |
| 1,737,242 A | * | 11/1929 | Hooley | 285/149.1 |
| 1,776,652 A | * | 9/1930 | Clayton | 285/154.3 |
| 1,793,883 A | * | 2/1931 | Church | 285/154.4 |
| 2,111,243 A | * | 3/1938 | Hecht | 285/154.1 |
| 2,124,942 A | * | 7/1938 | Barnard | 285/154.3 |
| 2,333,580 A | * | 11/1943 | Renshaw et al. | 285/149.1 |
| 2,475,322 A | * | 7/1949 | Horton et al. | 285/154.2 |
| 2,487,912 A | * | 11/1949 | Wellman | 285/154.4 |
| 3,454,291 A | * | 7/1969 | Eidelberg et al. | 285/371 |
| 3,556,566 A | * | 1/1971 | Bromberg | 285/149.1 |
| 4,091,523 A | * | 5/1978 | Riecke | 285/417 |
| 4,995,647 A | * | 2/1991 | Carey | 285/149.1 |

* cited by examiner

*Primary Examiner* — David E Bochna
(74) *Attorney, Agent, or Firm* — Ware, Fressola, Maguire & Barber LLP (57) ABSTRACT

A transition coupler for coupling a flexible metal conduit (FMC) to an electrical metallic tubing (EMT) or rigid conduit comprises a housing with a hollow cylinder having an aperture passing therethrough, the aperture for receipt of an EMT or a rigid conduit. The cylinder includes an extension with recesses. The first shell member is secured to the extension and is shaped to support an FMC. The shell member has first and second flanges, the first flange having apertures and the second flange having an elongated groove. A second shell member has first and second flanges, the second flange having an extending projection for passage through the elongated groove of the first shell member, thereby providing for securement of the FMC to the transition coupler upon receipt of screws through the first and second shell members. A ring having tabs is inserted within the recesses of the extension.

8 Claims, 7 Drawing Sheets

FLEXIBLE METAL CONDUIT TO ELECTRICAL METALLIC TUBING/RIGID CONDUIT TRANSITION COUPLER

TECHNICAL FIELD

The present application relates to a transition coupler particularly for coupling a flexible metal conduit (FMC) to either an electrical metallic tubing (EMT) or a rigid conduit.

BACKGROUND OF THE INVENTION

The need for being able to couple a flexible metal conduit (FMC) to an electrical metallic tubing (EMT) or rigid conduit has existed for many years. Typically, when there was a need for performing such a coupling, individual fittings have been used designed for EMT rigid conduit, and FMC, such as a strap type connector, a rigid straight coupling and a set screw connector. The end result is a fairly laborious procedure which may be relatively large due to the multiple components involved.

SUMMARY OF THE INVENTION

It is therefore an object of the present invention to provide a simple manner for coupling an FMC to an EMT or rigid conduit.

An embodiment of the present invention is a transition coupler for coupling a flexible metal conduit to an electrical metallic tubing or rigid conduit, comprising a housing comprising a hollow cylinder having an aperture passing therethrough from a first end of the cylinder to a second end of the cylinder, the aperture dimensioned for receipt of an electrical metallic tubing or a rigid conduit, the cylinder including a region having a smaller inside diameter than a diameter of said aperture, said region dimensioned to contact an end of the electrical metallic tubing or rigid conduit when the electrical metallic tubing or rigid conduit is inserted into the aperture, the cylinder having a plurality of threaded apertures extending through the cylinder, each threaded aperture dimensioned for receipt of a screw to securely fasten the electrical metallic tubing or rigid conduit to the cylinder, the cylinder including a cylindrical extension at the second end of the cylinder, the cylindrical extension having a plurality of recesses formed therein, a first shell member secured to the cylindrical extension, the first shell member substantially hemispherical in shape and dimensioned to support a flexible metal conduit along an interior of the first shell member, the shell member having a first radially extending flange formed at a first end of the first shell member and a second radially extending flange formed at a second end of the first shell member, the first flange having a plurality of threaded apertures formed therein and the second flange having an elongated groove formed therein, a second shell member substantially hemispherical in shape dimensioned to support the flexible metal conduit along an interior of the second shell member, the second shell member having a first radially extending flange formed at a first end of the second shell member and a second radially extending flange formed at a second end of the second shell member, the first flange having a plurality of slots formed therein and the second flange having an extending projection, the projection dimensioned for passage through the elongated groove of the first shell member and the plurality of slots of the second shell member dimensioned so as to be aligned with the threaded apertures of the first shell member, thereby providing for securement of the flexible metal conduit to the transition coupler upon receipt of screws through said plurality of threaded apertures of the first and second shell members; and a ring dimensioned for insertion into the cylindrical extension of the cylinder, the ring having a plurality of radially extending tabs dimensioned for insertion within the recesses formed in the cylindrical extension, the ring dimensioned to contact an end of the flexible metal conduit relative when the flexible metal conduit is supported by the interior of the first shell member and the interior of the second shell member.

Another embodiment of the present invention is the transition coupler as described above, wherein the first shell member includes at least one ridge formed within the interior of the first shell member and wherein the second shell member includes at least one ridge formed within the interior of the second shell member, the ridges of the first and second shell members positioned relative to each other so as to be within a helical channel of a flexible metal conduit supported by the interior of the first shell member and the interior of the second shell member.

A further embodiment of the present invention is the transition coupler as described above, wherein the first shell member includes two ridges spaced apart from each other relative to a longitudinal direction of the first shell member and the second shell member includes a ridge positioned so as to be juxtaposed in spaced relationship between the two ridges of the first shell member.

A still further embodiment of the present invention is the transition coupler as described above, wherein the ridges of the first and second shell members are formed within the first and second shell members respectively.

Another embodiment of the present invention is the transition coupler as described above, wherein the hollow cylinder, first shell member and second shell member are fabricated from sheet metal.

A further embodiment of the present invention is the transition coupler as described above, wherein the hollow cylinder, first shell member and second shell member are fabricated from a zinc alloy.

A still further embodiment of the present invention is the transition coupler as described above, wherein the ring is fabricated from an electrical insulator material.

Another embodiment of the present invention is the transition coupler as described above, wherein the first shell member is secured to the hollowed cylinder with a seam.

BRIEF DESCRIPTION OF THE DRAWINGS

For a fuller understanding of the nature and objects of the present invention, reference is made to the following detailed description taken in conjunction with the following drawings in which.

DETAILED DESCRIPTION OF THE DRAWINGS

Figure 1:
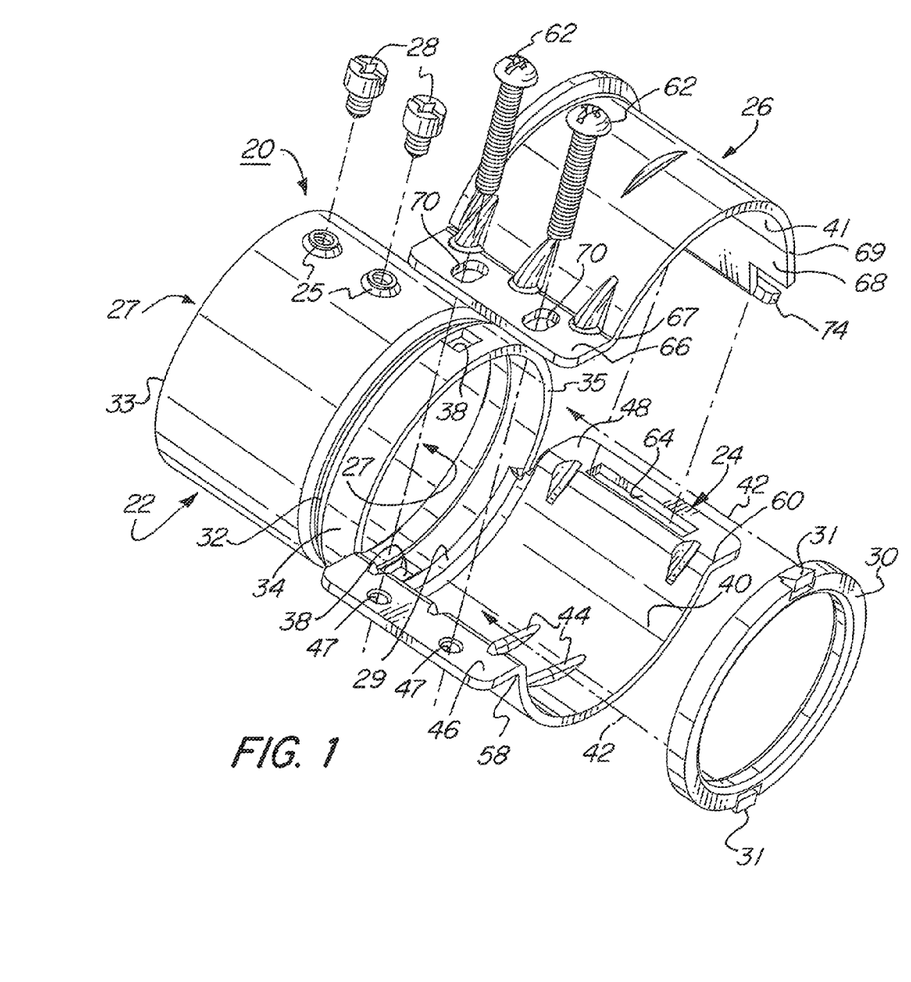
FIG. 1 is a perspective view of a transition coupler according to the present invention particularly for coupling a flexible metal conduit (FMC) to either an electrical metallic tubing (EMT) or a rigid conduit.
Figure 2:
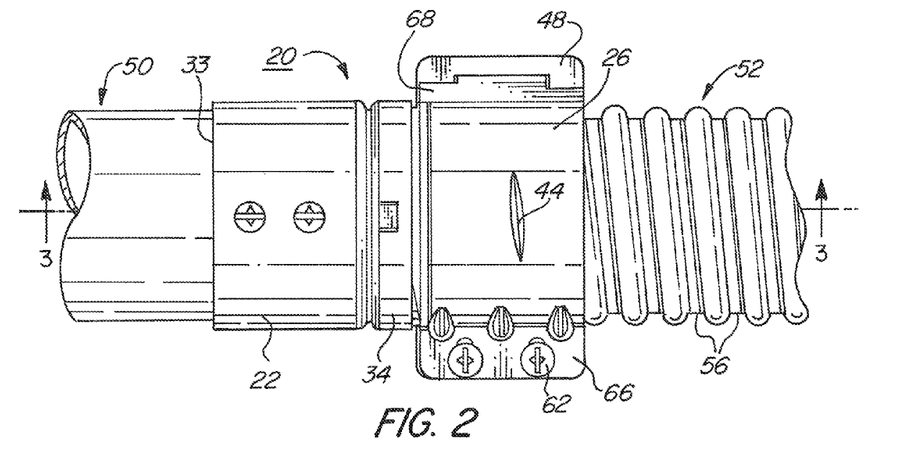
FIG. 2 is a side view of the transition coupler shown in FIG. 1.
Figure 3:
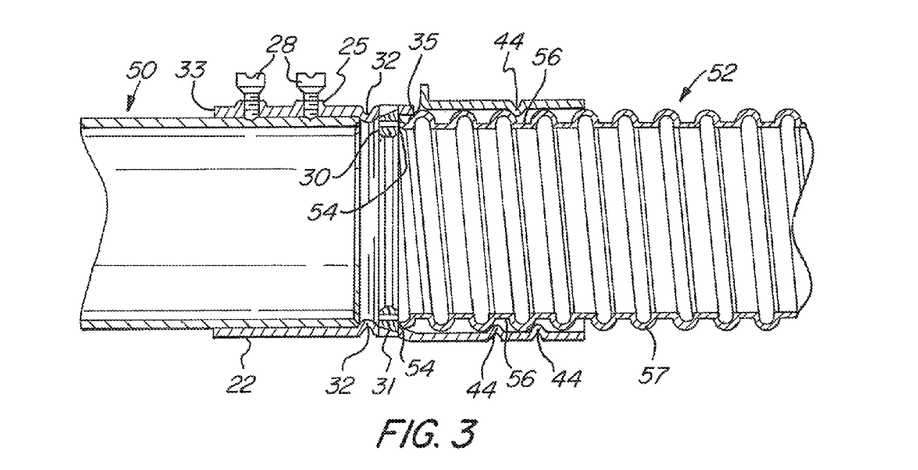
FIG. 3 is a cross-sectional view of the transition coupler taken along line 3-3 of FIG. 2.
Figure 4:
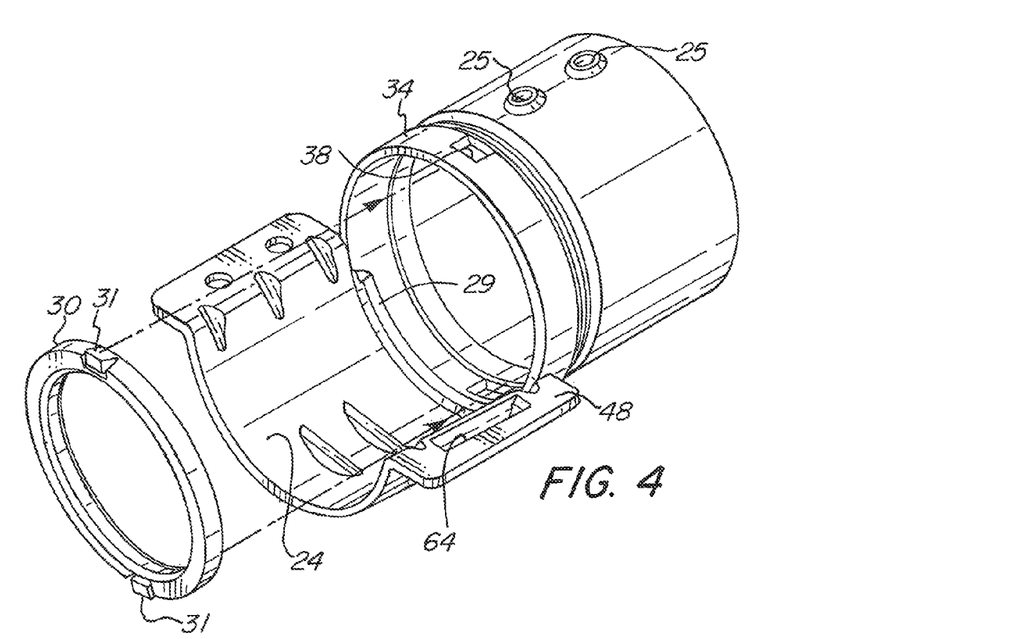
FIG. 4 is a perspective view of the transition coupler shown in FIG. 1 with the second shell member not shown and illustrating the manner in which the ring is positioned relative to the cylindrical extension of the hollow cylinder.
Figure 8:
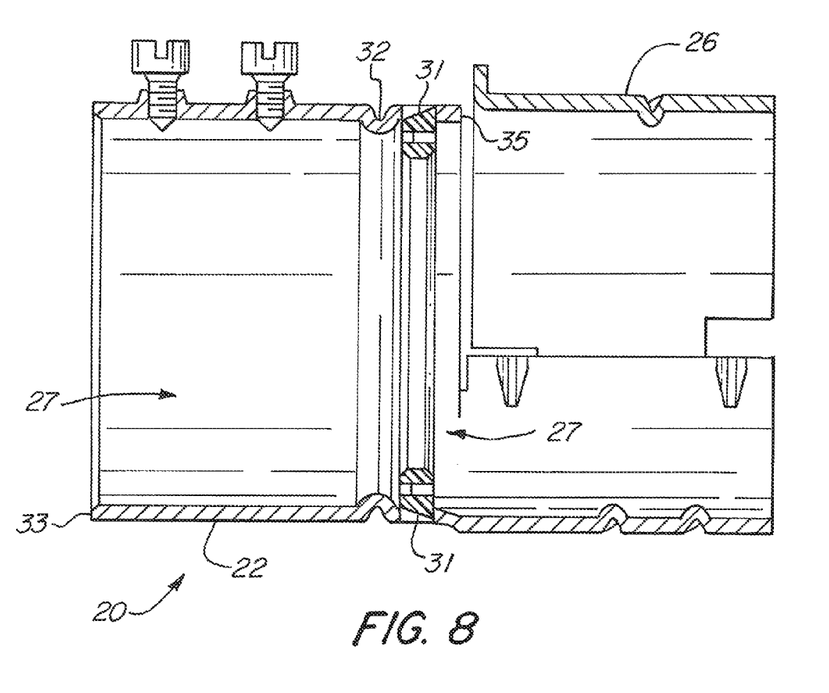
FIG. 8 is a cross-sectional view of the transition coupler taken along line 8-8 of FIG. 7
Figure 9:
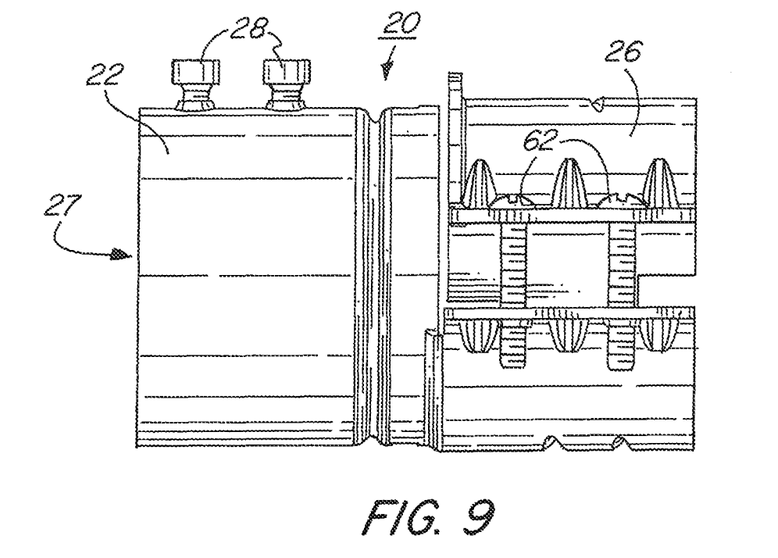
FIG. 9 is right side view of the transition coupler showing the screws positioned within the threaded apertures of both the hollow cylinder and the first and second shell members.
Figure 10:
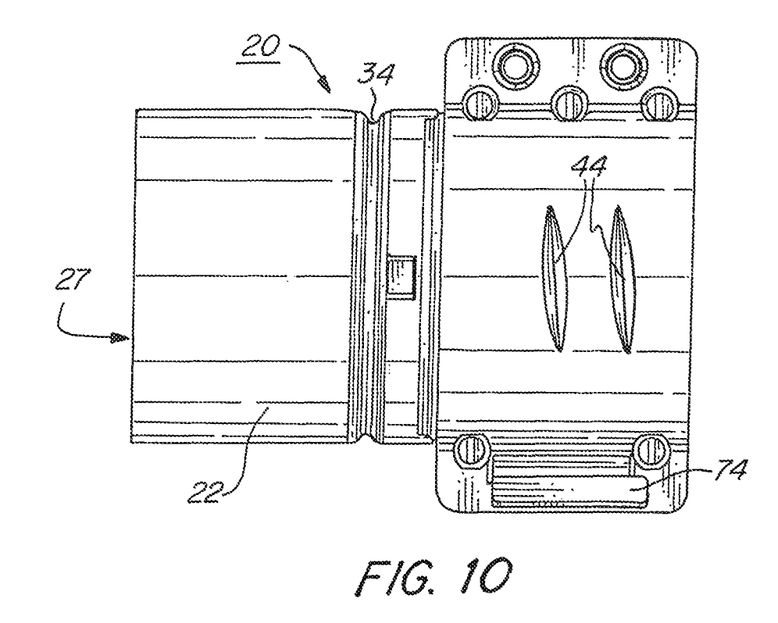
FIG. 10 is a bottom view of the transition coupler.
Figure 11:
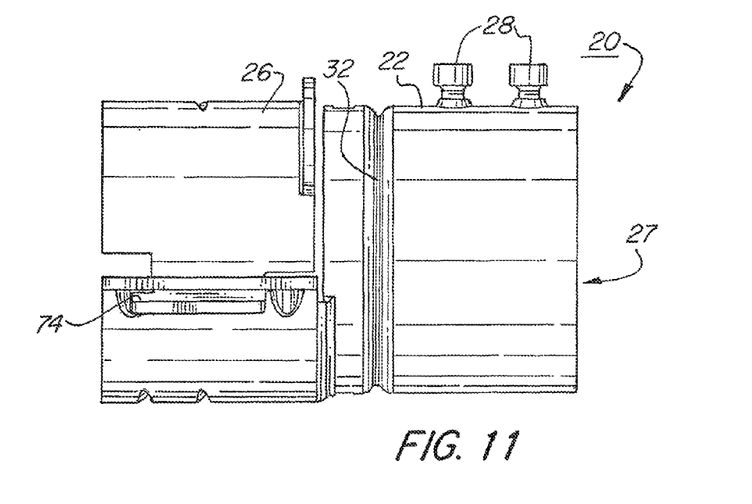
FIG. 11 is a left side view of the transition coupler.
Figures 12, 13:
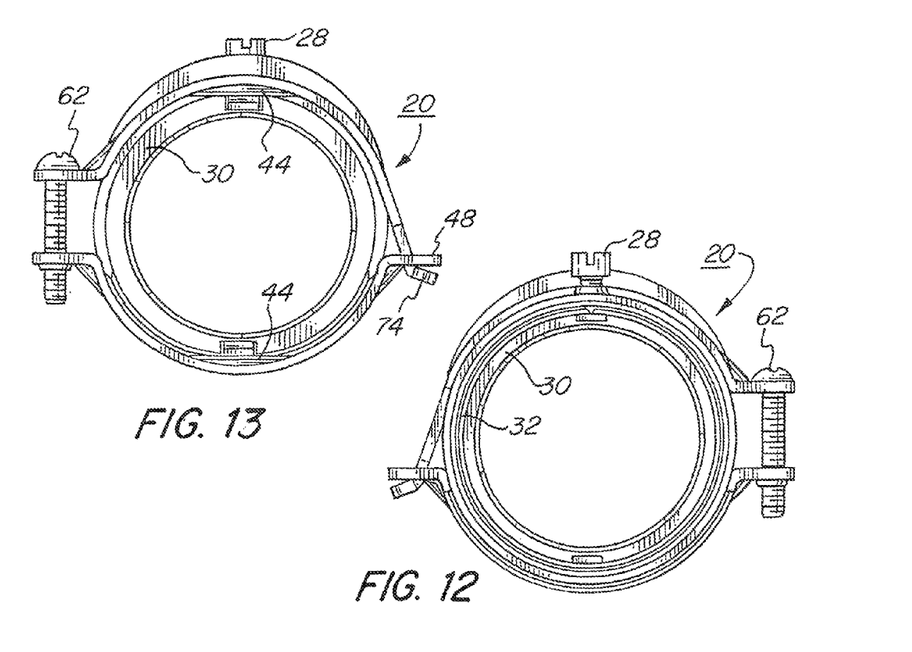
FIG. 12 is a front view of the transition coupler.
FIG. 13 is a rear view of the transition coupler.

As seen in FIG. 1, an embodiment of the transition coupler 20 according to the present invention comprises a hollow cylinder 22, a first shell member 24 and a second shell member 26. The first shell member is secured to the hollow cylinder typically by a crimped on seam 29 as seen in FIG. 1. Other forms of securement could be used, such as welding and the like. The hollow cylinder includes a pair of threaded apertures 25 for receiving screws 28. The screws provide for securing an EMT or rigid conduit to the hollow cylinder as best seen in FIGS. 2 and 3. The cylinder also includes a region 32 having a smaller inside diameter than the diameter of aperture 27 formed within the hollow cylinder 22. This aperture, as seen in FIGS. 1 and 8 passes through the hollow cylinder from a first end 33 to a second end 35. Region 32 is dimensioned to contact an end of the electrical metallic tubing or rigid conduit 50 as best seen in FIG. 3.

Cylinder 22 further includes a cylindrical extension 34 that extends from the reduced diameter region 32 to the second end 35 of the cylinder. This cylindrical extension includes a plurality of recesses 38. These recesses are dimensioned for receipt of tabs 31 which extend radially outward from ring 30 as seen in FIG. 1. FIG. 1 also shows by arrows 42 how the ring is inserted within the cylindrical extension 34 prior to attachment of second shell member 26 with respect to first shell member 24. Ring 30 is dimensioned to contact an end 54 of a flexible metal conduit 52 as best seen in FIG. 3. The ring is typically fabricated from an electrical insulator material, such as a thermoplastic material (e.g., nylon, poly (acrylonitrile butadiene styrene) -ABS-, polyvinyl chloride -PVC-). As seen in FIGS. 1-13, the first shell member 24 is hemispherical in shape and dimensioned to support a flexible metal conduit 52. The first shell member has an interior 40 that can support the FMC. It also includes ridges 44 spaced apart from each other at a distance so as to be able to reside within helical channel 56 of the FMC. The ridges thereby resist movement of the FMC relative to the first shell member when the FMC is secured to the transition coupler. This is seen in FIG. 3 by FMC helical rim 57 in contact with ridges 44.

The first shell member also includes a first radially extending flange 46 and a second radially extending flange 48. The first radially extending flange includes a plurality of threaded apertures 47 dimensioned for receipt of screws 62. The first radially extending flange is formed at a first end 58 of first shell member 24. The second radially extending flange 48 extends from the first shell member at second end 60 of the first shell member. The second radially extending flange includes an elongated groove 64 formed therein.

The second shell member 26 is also substantially hemispherical in shape as seen in FIGS. 1-13. This second shell member is dimensioned to also support a flexible metal conduit along an interior 41 of the second shell member. The second shell member also has a first radially extending flange formed at a first end 67 of the second shell member 26. The second shell member also includes a second radially extending flange 68 formed at a second end 69 of the second shell member.

The first extending flange 66 of the second shell member includes a plurality of slots 70 for passage therethrough of screws 62 as best seen in FIG. 1. Slots 70 are positioned on the first radially extending flange 66 so as to be aligned with the threaded apertures 47 in the first radially extending flange 46 of first shell member 24.

Figure 5:
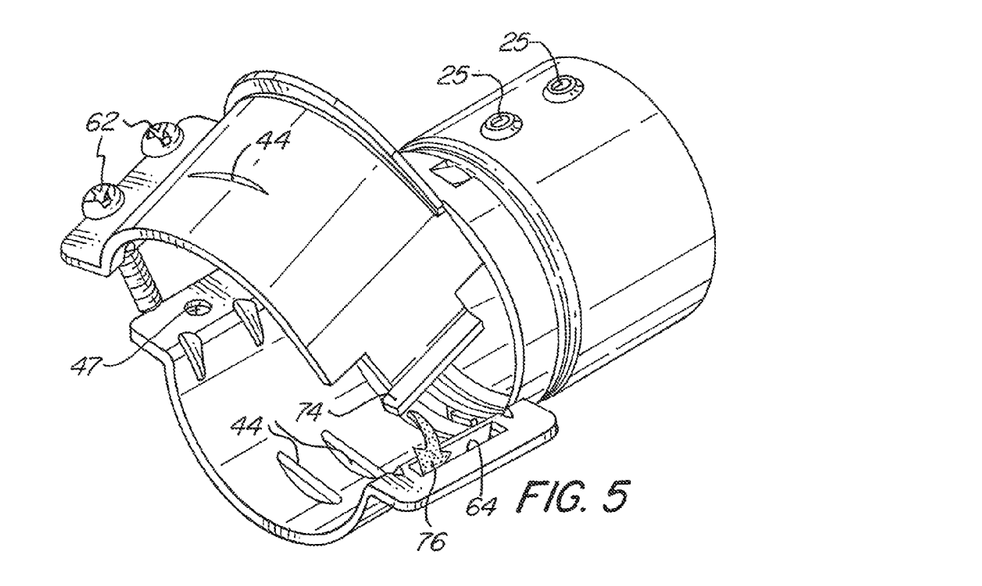
FIG. 5 is a perspective view of the transition coupler further illustrating the second shell member and how it is positioned relative to the first shell member.
Figure 6:
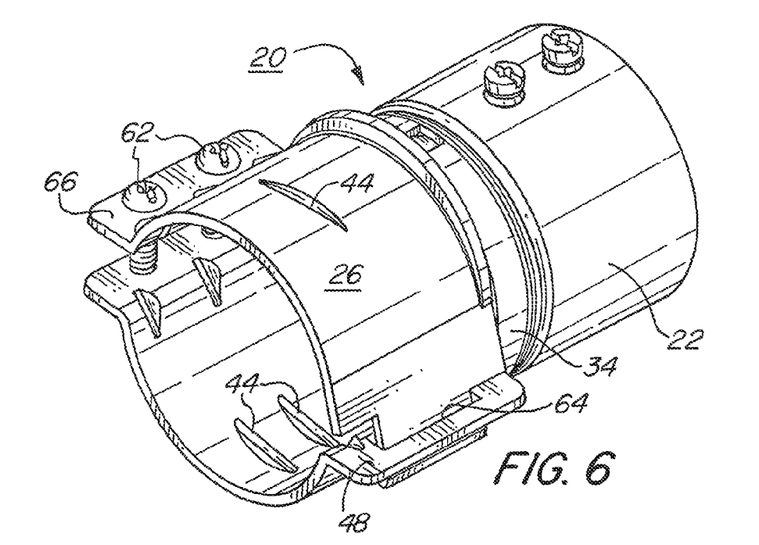
FIG. 6 is a perspective view of the transition coupler illustrating how an extending projection of the second shell member is positioned through an elongated groove formed in the first shell member, as well as showing screws threaded through threaded apertures within the first and second shell members.
Figure 7:
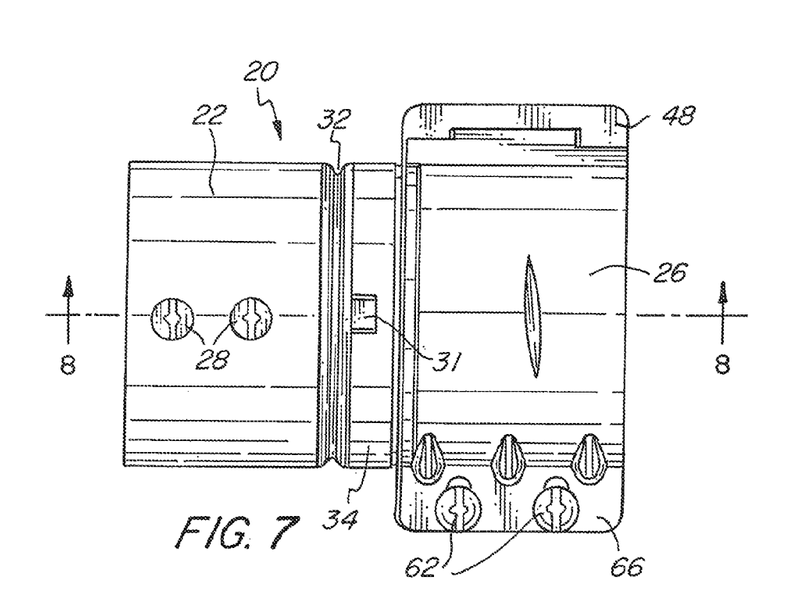
FIG. 7 is a top view of the transition coupler showing the second shell member positioned relative to the first shell member, including screws mounted in the apertures of both the cylinder and the first and second shell members.

The second radially extending flange 68 of the second shell member 26 includes a projection 74 which is dimensioned for passage through the elongated groove 64 in the second radially extending flange 48 of first shell member 24. The positioning of the projection relative to the elongated slot in the first shell member is shown in FIG. 5 via arrow 76. Once the projection 74 is through elongated slot 64, screws 62 passing through slots 70 can be threaded into threaded apertures 47 as seen in FIG. 5. Thus, when a FMC is placed between the first and second shell members, the second shell member can be pulled toward the first shell member thereby securing the FMC to the transition coupler. Ridges 44 in the first shell member, as well as ridge 44 in the second shell member are thereby able to be positioned within the helical channel 56 of the FMC as best seen in FIGS. 2 and 3.

The first and second shell members are typically fabricated from sheet metal which provides for sufficient elasticity or "springiness" of the shell members relative to each other so as to be pulled toward each other and thereby secure the FMC to the transition coupler. The hollow cylinder, first shell member and second shell member can not only be fabricated from sheet metal, but also from other materials, such as a zinc alloy type of sheet metal.

Although two threaded apertures 25 are shown associated with the hollow cylinder 22, one or more threaded apertures may be used in alternative embodiments. Similarly, although two threaded apertures 47 and corresponding slots 70 are shown with respect to the first and second shell members respectively, fewer or additional threaded apertures and corresponding slots may be used.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A transition coupler for coupling a flexible metal conduit to an electrical metallic tubing or rigid conduit, comprising:
    a housing comprising:
        a hollow cylinder having an aperture passing therethrough from a first end of the cylinder to a second end of the cylinder, the aperture dimensioned for receipt of an electrical metallic tubing or a rigid conduit, the cylinder including a region having a smaller inside diameter than a diameter of said aperture, said region dimensioned to contact an end of the electrical metallic tubing or rigid conduit when the electrical metallic tubing or rigid conduit is inserted into the aperture, the cylinder having a plurality of threaded apertures extending through the cylinder, each threaded aperture dimensioned for receipt of a screw to securely fasten the electrical metallic tubing or rigid conduit to the cylinder, the cylinder including a cylindrical extension at the second end of the cylinder, the cylindrical extension having a plurality of recesses formed therein,
        a first shell member secured to the cylindrical extension, the first shell member substantially hemispherical in shape and dimensioned to support a flexible metal conduit along an interior of the first shell member, the shell member having a first radially extending flange formed at a first end of the first shell member and a second radially extending flange formed at a second end of the first shell member, the first flange having a plurality of threaded apertures formed therein and the second flange having an elongated groove formed therein,
        a second shell member substantially hemispherical in shape dimensioned to support the flexible metal conduit along an interior of the second shell member, the second shell member having a first radially extending flange formed at a first end of the second shell member and a second radially extending flange formed at a second end of the second shell member, the first flange having a plurality of slots formed therein and the second flange having an extending projection, the projection dimensioned for passage through the elongated groove of the first shell member and the plurality of slots of the second shell member dimensioned so as to be aligned with the threaded apertures of the first shell member, thereby providing for securement of the flexible metal conduit to the transition coupler upon receipt of screws through said plurality of threaded apertures of the first and second shell members; and
    a ring dimensioned for insertion into the cylindrical extension of the cylinder, the ring having a plurality of radially extending tabs dimensioned for insertion within the recesses formed in the cylindrical extension, the ring dimensioned to contact an end of the flexible metal conduit when the flexible metal conduit is supported by the interior of the first shell member and the interior of the second shell member.

2. The transition coupler according to claim 1, wherein the first shell member includes at least one ridge formed within the interior of the first shell member and wherein the second shell member includes at least one ridge formed within the interior of the second shell member, the ridges of the first and second shell members positioned relative to each other so as to be within a helical channel of a flexible metal conduit supported by the interior of the first shell member and the interior of the second shell member.

3. The transition coupler according to claim 2, wherein the first shell member includes two ridges spaced apart from each other relative to a longitudinal direction of the first shell member and the second shell member includes a ridge positioned so as to be juxtaposed in spaced relationship between the two ridges of the first shell member.

4. The transition coupler according to claim 3, wherein all the ridges of the first and second shell members are formed within the first and second shell members respectively.

5. The transition coupler according to claim 4, wherein the hollow cylinder, first shell member and second shell member are fabricated from sheet metal.

6. The transition coupler according to claim 4, wherein the hollow cylinder, first shell member and second shell member are fabricated from a zinc alloy.

7. The transition coupler according to claim 1, wherein the ring is fabricated from an electrical insulator material.

8. The transition coupler according to claim 1, wherein the first shell member is secured to the hollowed cylinder with a crimped on seam.

* * * * *